United States Patent
Onoue (10) Patent No.: US 7,222,110 B2
(45) Date of Patent: May 22, 2007

(54) CHARGE INFORMATION PROCESSING APPARATUS, FRANCHISE SYSTEM PROVIDED WITH THE CHARGE INFORMATION PROCESSING APPARATUS, CHARGE CALCULATING METHOD, RECORDING MEDIUM, AND PROGRAM

(75) Inventor: Masashi Onoue, Tokyo (JP)

(73) Assignee: CCC Co., Ltd., Tokyo (JP)

( * ) Notice: Subject to any disclaimer, the term of this patent is extended or adjusted under 35 U.S.C. 154(b) by 955 days.

(21) Appl. No.: 09/761,844

(22) Filed: Jan. 16, 2001

(65) Prior Publication Data

US 2002/0019787 A1 Feb. 14, 2002

(30) Foreign Application Priority Data

Aug. 14, 2000 (JP) ............................. 2000-245861

(51) Int. Cl.
G06Q 99/00 (2006.01)
(52) U.S. Cl. ............................ 705/400; 701/35; 705/1; 705/37; 707/102
(58) Field of Classification Search ................. 705/26, 705/37, 16, 27, 1, 29, 400, 4, 30, 35; 707/6, 707/102
See application file for complete search history.

(56) References Cited

U.S. PATENT DOCUMENTS

| | | | |
|---|---|---|---|
| 4,404,639 A * | 9/1983 | McGuire et al. .............. | 701/35 |
| 5,657,233 A | 8/1997 | Cherrington et al. | |
| 6,351,738 B1 * | 2/2002 | Clark .......................... | 705/37 |
| 6,523,041 B1 * | 2/2003 | Morgan et al. ............. | 707/102 |
| 2003/0221118 A1 * | 11/2003 | Walker ........................ | 713/193 |

FOREIGN PATENT DOCUMENTS

| | | |
|---|---|---|
| JP | 06-338958 | 12/1994 |
| JP | 09-102003 | 4/1997 |
| JP | 10-307868 | 11/1998 |
| JP | 11-282904 | 10/1999 |
| JP | 2000-090171 | 3/2000 |
| JP | 2000-123255 * | 4/2000 |
| JP | 2000-194764 | 7/2000 |
| KR | 2000-24104 | 5/2000 |
| KR | 2000-33243 | 6/2000 |
| KR | 2000-37210 | 7/2000 |

OTHER PUBLICATIONS

Mikolajczyk, Sigmund J., Too good to be true?; Aug. 5, 1996; Tire Business p. 14.*

(Continued)

Primary Examiner—John W. Hayes
Assistant Examiner—Freda A. Nelson
(74) Attorney, Agent, or Firm—Trexler, Bushnell, Giangiorgi, Blackstone & Marr, Ltd.

(57) ABSTRACT

A charge information calculating apparatus according to the present invention has a configuration provided with inputting means for inputting information, and charge calculating means for calculating introduction expenses of facilities required for working as a franchisee that provides automobile repairing services by a specific repairing method. With this configuration, it is possible to provide a charge information processing apparatus for calculating introduction expenses of facilities required for working as a franchisee that provides automobile repairing services by a specific repairing method.

25 Claims, 5 Drawing Sheets

OTHER PUBLICATIONS

Sherman, Andrew J., Hard data on franchises. (Frederal trade Commision's Uniform Franchise Offering Circular); Feb. 1994; Nation's Business, v82, n2, p. 54(1).*

"LH Web site focuses on franchise costs", Mar. 1998, Lodging Hospitality, v54n3, pp. 41.*

Fillerup, Jeffrey L., "More on the millennium bug : How will it impact your system?", Jul./Aug. 1998, Franchising World, vol. 30, Iss.. 4; p. 41, 3 pgs.*

"Understanding The Uniform Franchise Offering Circular", Apr. 1999, The Franchise Doctor's Newsletter, vol. IV, No. IV.* www.aamcotransmissions.com.* www.franchise.com.*

"The Uniform Franchise Offering Circular Guidelines", Jan. 17, 1999, ftc.gov.*

* cited by examiner

```
Mr.(Ms.) ○○○○                    AUGUST 1, 2000
                    ESTIMATE

REPAIRING METHOD      ¥ 0000. —
        INSTRUCTING FEE

ROYALTY           ¥ 0000. —

FACILITY
        INTRODUCTION          ¥ 0000. —
        EXPENSES

REPAIRING INSTRUMENTS      ¥ 0000. —
   REPAIRING MATERIAL PRICES
   ─────────────────────────────────────

TOTAL    ¥ 00000. —
```

CHARGE INFORMATION PROCESSING APPARATUS, FRANCHISE SYSTEM PROVIDED WITH THE CHARGE INFORMATION PROCESSING APPARATUS, CHARGE CALCULATING METHOD, RECORDING MEDIUM, AND PROGRAM

BACKGROUND OF THE INVENTION

1. Field of the Invention

The present invention relates to a charge information processing apparatus for calculating charges required for working as a franchisee that offers automobile repairing services by a specific repairing method, and a franchise system provided with the charge information processing apparatus.

2. Description of the Related Art

Conventionally, services for repairing automobiles with a specific repairing method are provided by franchised automobile repairers (franchisees). According to the automobile repairing services, since a specific repairing method is standardized, a customer can be offered a certain level of repairing services whichever automobile repairer the customer selects to have an automobile repaired as long as the repairer is franchised.

In general, in order to work as a franchisee, an existing automobile repairer that is not franchised is required to conclude a predetermined agreement (a franchise agreement) with a franchise head office and pay introduction expenses for facilities required for working as a franchisee that provides automobile repairing services by a specific repairing method to the franchise head office (1).

In addition, there are other charges which the existing automobile repairer is required to pay to the franchise head office, namely, an instruction fee for the specific repairing method (2), a royalty (3), and prices of repairing instruments and repairing materials that are required for implementing the specific repairing method (4). The existing automobile repairer is allowed to work as the above-mentioned franchisee through the payment of these charges (1) through (4).

The above-mentioned charge (1) is usually presented to the existing automobile repairer as an estimation or the like before concluding an agreement. In addition, the charge (1) is usually processed as sales of the franchise head office after concluding the agreement.

As described above, since the charge (1) is required in many cases, a charge information processing apparatus for calculating the charge (1) is desired.

In addition, facilities that should be introduced are different depending on the scale of a repair shop owned by the existing automobile repairer and thus, the charge (1) is not fixed. Therefore, a charge information processing apparatus for calculating the charge (1) corresponding to the scale of the repair shop owned by the existing automobile repairer is desired.

Moreover, in addition to the charge (1), the above-mentioned charges (2) through (4) are simultaneously presented to the existing automobile repairer as estimations or the like before concluding the agreement. In addition, the charges (2) through (4) are usually and simultaneously processed as sales of the franchise head office after concluding the agreement.

As described above, since all the charges (1) through (4) are simultaneously required in many cases, a charge information processing apparatus for calculating all the charges (1) through (4) is desired.

SUMMARY OF THE INVENTION

A charge information processing apparatus in accordance with the present invention is a charge information processing apparatus for calculating charges required for working as a franchisee that provides automobile repairing services by a specific repairing method comprising: inputting means for inputting information; and charge calculating means for calculating introduction expenses for facilities required for working as the franchisee that provides the automobile repairing services by the specific repairing method based on the information inputted by the inputting means.

According to the present invention, it is possible to provide a charge information processing apparatus for calculating introduction expenses for facilities required working as a franchisee that provides automobile repairing services by a specific repairing method.

The inputting means in the charge information processing apparatus is the means for inputting scale information of a repair shop, and the charge calculating means preferably calculates the introduction expenses based on the scale information of the repair shop inputted by the inputting means. In this way, it is possible to provide a charge information processing apparatus for calculating introduction expenses corresponding to a scale of a repair shop.

In addition, the charge calculating means in the charge information processing apparatus desirably further calculates an instruction fee for a specific repairing method, a royalty and prices of repairing instruments and repairing materials that are required for implementing the specific repairing method. In this way, it is possible to provide a charge information processing apparatus for calculating all of introduction expenses (1), an instruction fee for a specific repairing method (2), a royalty (3), and prices of repairing instruments and repairing materials.

As a specific repairing method in the charge information processing apparatus, a method utilizing procedures, repairing instruments and repairing materials that are devised for completing repairs in a short time can be used.

In addition, a method utilizing procedures, repairing instruments and repairing materials that are devised for providing repairs for a low charge can be used as the specific repairing method in the charge information processing apparatus.

In addition, the specific repairing method in the charge information processing apparatus can include repairing processes in which usage amounts of the repairing materials are defined.

In addition, the repairing instruments in the charge information processing apparatus can be provided with measuring means for measuring the repairing materials of amounts corresponding to the usage amounts.

In addition, the specific repairing method in the charge information processing apparatus can include repairing processes in which usage duration of the repairing instruments is defined.

In addition, the repairing instruments in the charge information processing apparatus can be provided with timing means for timing such that the usage of the repairing instruments is finished within the usage duration.

In addition, a method for repairing slight damages of automobiles can be used as the specific repairing method in the charge information processing apparatus.

The charge information processing apparatus is preferably further provided with first repairing material inventory managing means for managing the inventory of the repairing materials to be provided to franchisees.

The charge information processing apparatus is preferably further provided with instructing material inventory managing means for managing the inventory of the instructing materials for instructing franchisees on the specific repairing method.

The charge information processing apparatus is preferably further provided with franchisee information managing means for managing information of franchisees, and franchisee number managing means for managing the number of franchisees in each region.

The charge information processing apparatus is preferably further provided with branching plan information preparing means for outputting information for preparing branching plans based on the number of franchisees for each region that is managed by the franchisee number managing means.

The charge information processing apparatus is preferably further provided with sales information acquiring means for acquiring sales information of franchisees, gross sales managing means for managing sales information of the franchisees acquired by the sales information acquiring means, gross sales estimating means for calculating gross sales estimation in a predetermined period based on the sales information managed by the gross sales managing means, and demand estimating means for estimating demands of the repairing materials based on the results of the gross sales estimation calculated by the gross sales estimating means.

The sales information acquiring means in the charge information processing apparatus can acquire sales information from an estimation apparatus for calculating estimations of automobile repairing services by the specific repairing method via communicating means.

The inputting means in the charge information processing apparatus is the means for inputting scale information of a repair shop, and is preferably provided with introduction plan information preparing means for preparing information of a plan for introducing facilities that are required for working as a franchisee based on the scale information of a repair shop inputted by the inputting means.

The calculating means in the charge information processing apparatus can calculate introduction expenses based on the introduction plan information prepared by the introduction plan information preparing means.

The charge calculating means in the charge information processing apparatus can calculate an amount that is the total amount of the introduction expenses, the instruction fee, the royalty, and the prices of the repairing instruments and the repairing materials.

The charge information processing apparatus is preferably further provided with notifying means for notifying a charge collection handling agent of a request for collection handling of the total amount.

The charge information processing apparatus is preferably further provided with outputting means for outputting the introduction expenses, the instruction fee, the royalty, the prices of the repairing instruments and the repairing materials, and the total amount thereof calculated by the charge calculating means after editing them in a predetermined document format. As the outputting means, either an image display apparatus or a printer can be used. The predetermined document format can be a form of either an estimate or an invoice.

A franchise system provided with a charge information processing apparatus according to the present invention comprises: a charge information processing apparatus for calculating charges required for working as a franchisee that provides automobile repairing services by a specific repairing method; an estimation apparatus for calculating estimations of automobile repairing services by the specific repairing method; and communicating means for communicating data between the charge information processing apparatus and the estimation apparatus, wherein the charge information processing apparatus is provided with charge calculating means for calculating an instruction fee for instructing the automobile repairer on the specific repairing method, a royalty, introduction expenses of facilities that are required for providing the automobile repairing services, and prices of repairing instruments and repairing materials that are required for implementing the specific repairing method.

The estimation apparatus in the franchise system is preferably further provided with second repairing material inventory managing means for managing the inventory of the repairing materials owned by a franchisee.

The estimation apparatus in the franchise system is preferably further provided with order information outputting means for outputting information for placing an order of the repairing materials.

The estimation apparatus in the franchise system is preferably further provided with sales managing means for managing information on sales by providing automobile repairing services based on the specific repairing method.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DETAILED DESCRIPTION OF THE PREFERRED EMBODIMENT

A franchise system provided with a charge information processing apparatus that is an embodiment of the present invention will be hereinafter described with reference to the drawings.

Figure 1:
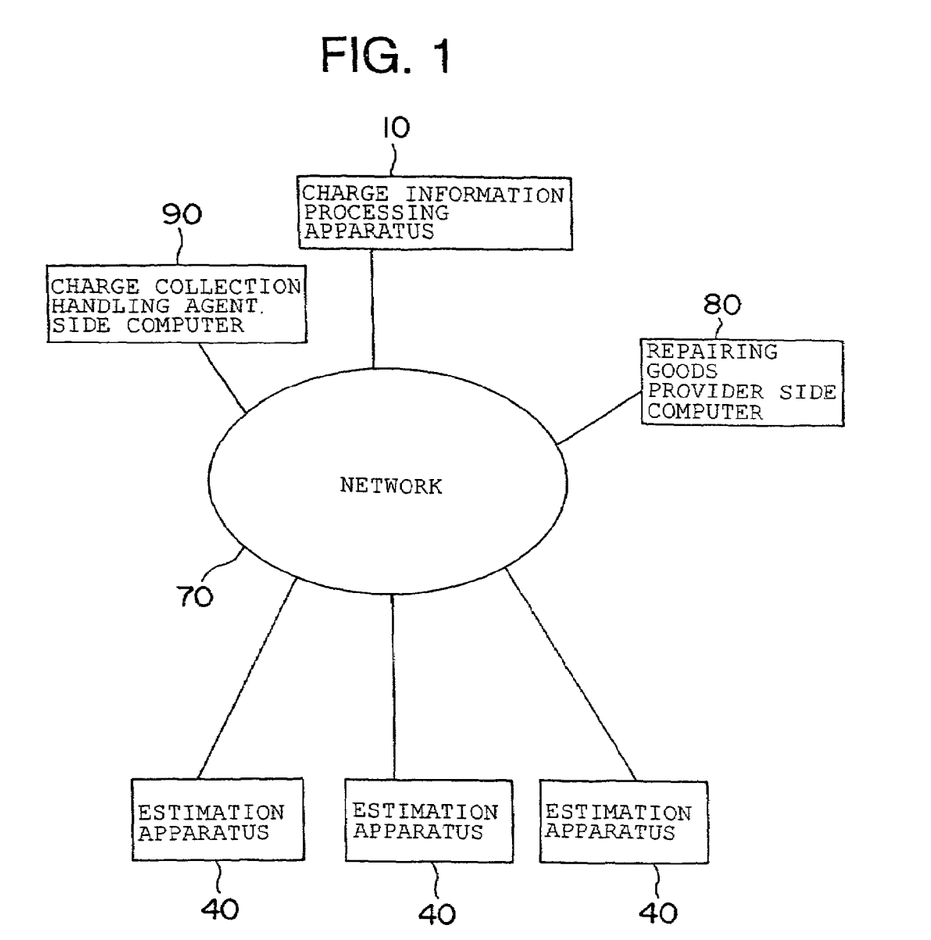
FIG. 1 is a diagram illustrating a configuration of a franchise system provided with a charge information processing apparatus of one embodiment of the present invention.

FIG. 1 is a diagram illustrating a general system configuration of a franchise system having a charge information processing apparatus 10 and a plurality of estimation apparatuses 40. Each of the charge information processing apparatus 10 and the plurality of estimation apparatuses 40 is connected to a network 70 (analog telephone lines, ISDN lines, dedicated lines, the Internet, or the like), and can mutually communicate data via the network 70.

The charge information processing apparatus 10 is provided, for example, in a head office of a franchise (hereinafter referred to as franchise head office) providing automobile repairing services by a specific repairing method (including a specific maintaining method). A computer system executing various kinds of processing such as estimation calculating processing for a new franchisee is used as the charge information processing apparatus 10. An estimation apparatus 40 is provided, for example, in a shop of a franchised automobile repairer. A computer system for executing various kinds of processing such as estimation calculating processing of repair charges for a customer is used as the estimation apparatus 40.

A repairing goods provider side computer 80 and a charge collection handling agent side computer 90 are also connected to the network 70, and can mutually communicate data with the charge information processing apparatus 10 and the estimation apparatus 40 via the network 70. The repairing goods provider side computer 80 is provided, for example, in a shop of a seller selling used automobile parts as repairing goods. The charge collection handling agent side computer 90 is provided in a shop of a bank, a credit card company and the like.

Figure 2:
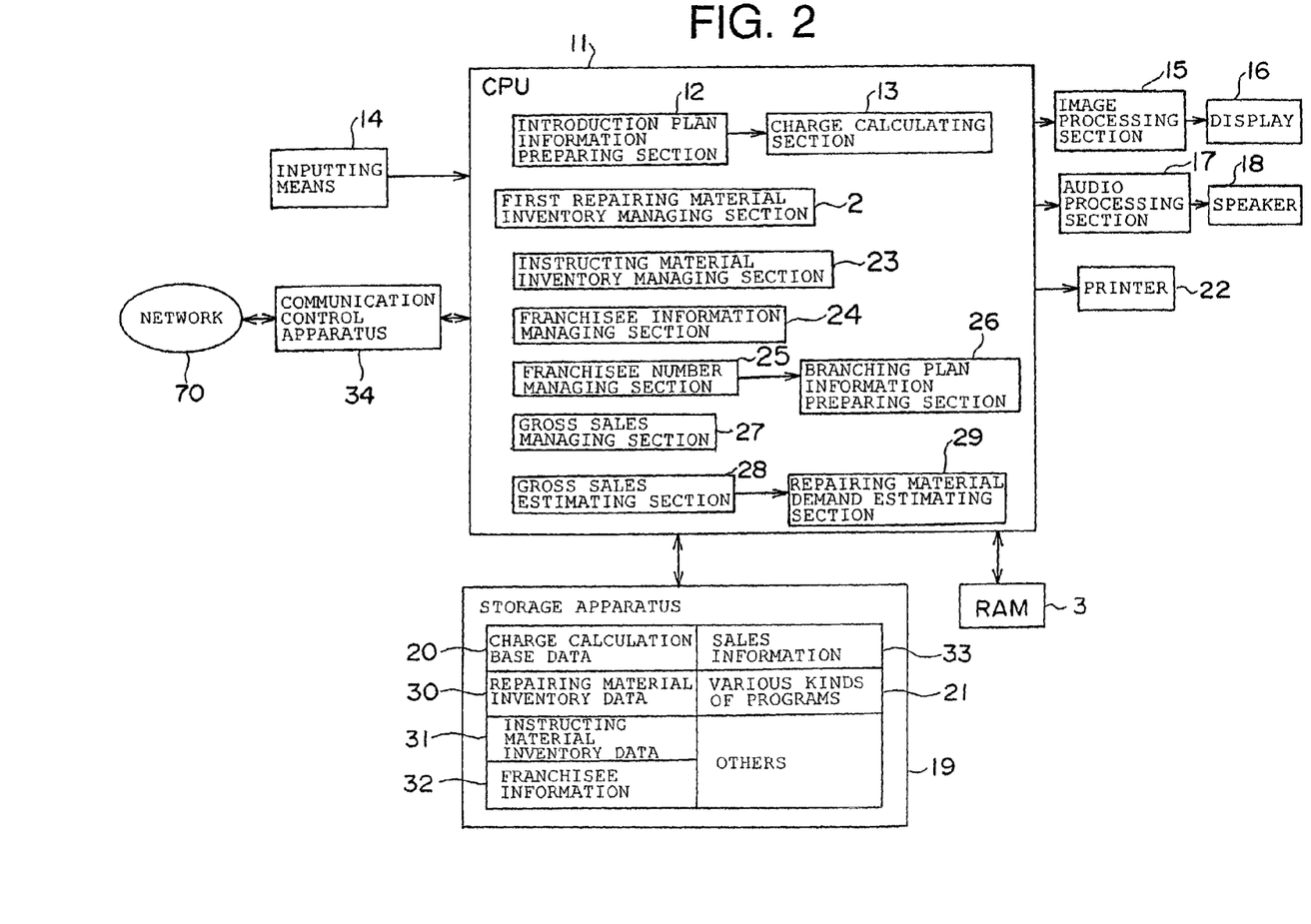
FIG. 2 is a block diagram illustrating a general configuration of the charge information processing apparatus of this embodiment.

FIG. 2 is a block diagram illustrating a configuration example of the charge information processing apparatus 10 of this embodiment. The charge information processing apparatus 10 is provided with a CPU 11 that controls its operations. The CPU 11 functions as an introduction plan information preparing section 12 that is introduction plan information preparing means and as a charge calculating section 13 that is a charge calculating means in the present invention by executing various kinds of programs 21 (such as an operating system and an application) stored in a storage apparatus 19.

An input apparatus 14 being inputting means is connected to the CPU 11. The input apparatus 14 is the apparatus for inputting various kinds of information such as scale information of a repair shop (an automobile repair shop) and instructions in the charge information processing apparatus 10. For example, a keyboard is used as the input apparatus 14. The scale information and the like inputted from the input apparatus 14 by the operator are stored in an internal RAM 3 (or the storage apparatus 19) first.

Examples of the scale information of a repair shop inputted from the input apparatus 14 include a repairer name, an area of its repair shop, its repair capability (such as the number of existing workers, repair machines and instruments held by the repairer), types of computers held by the repairer and the number of computers, and existence of an LAN (Local Area Network) and its scale and form.

The storage apparatus 19 being storing means connected to the CPU 11 is composed, for example, of a hard disc. Charge calculation base data 20 that is a basis for calculating each charge of the above-mentioned (1) through (4) is stored in the storage apparatus 19. Examples of the charge calculation base data 20 include an introduction plan table that associates the scale information of a repair shop with the introduction plan information, and a charge list.

Examples of the introduction plan table include the scale information of a repair shop, the number of computers (including an estimation apparatus) to be introduced that is associated with the scale information of a repair shop, the number of pieces of software, and introduction plan information such as the scale and form of LAN construction. Examples of the charge list include a unit price of a computer (including the estimation apparatus) and its introduction work charge, a unit price of software and its introduction work charge, and a unit price of an LAN construction material and its construction work charge.

If the scale information of a repair shop is inputted from the inputting apparatus 14 by the operator, the introduction plan information associated with the inputted scale information of the repair shop is read out by the CPU 11 from the introduction plan table stored in the storage apparatus 19. The CPU 11 calculates introduction expenses based on the read out introduction plan information. For example, it is assumed that the introduction plan information including two computers that are planned to be introduced are read out from the storage apparatus 19, and a unit price of the computer to be introduced is two hundred thousand yen and their introduction work charge is thirty thousand yen in the charge list stored in the storage apparatus 19.

In this case, the total amount of four hundred thirty thousand yen is calculated as the introduction expenses by adding the amount of four hundred thousand yen, which is found by multiplying the unit price of two hundred thousand yen by the number of computers of two that are planned to be introduced, and the introduction work charge of 30 thousand yen. Further, if the introduction plan information including other items (software and an LAN that are planned to be introduced) is read out, the introduction expenses are calculated in the similar manner. In this way, the introduction expenses calculated by the CPU 11 correspond to the above-mentioned introduction expenses (1).

In addition, data for each of a basic instruction fee for the specific repairing method, a basic royalty, basic prices of the repairing instruments and the repairing materials required for implementing the specific repairing method, a coefficient K, and a fixed charge R is stored in the storage apparatus 19 as charge calculation base data. The CPU 11 calculates the above-mentioned instruction fee for the specific repairing method (2), royalty (3), prices of the repairing instruments and the repairing materials required for implementing the specific repairing method by multiplying the basic charges by the coefficient K, or adding or subtracting the fixed charge R.

For example, as a campaign for facilitating subscriptions of franchisees, it can be contemplated to calculate an amount by multiplying each basic charge for the above-mentioned (2) through (4) by the coefficient K of 1 or less (for example, 0.7). If the coefficient K is set as 1, the basic charges are found as they are.

In addition, it can be contemplated to calculate an amount by subtracting the fixed charge R from each basic charge for the above-mentioned (2) through (4). If the fixed charge R is set as 0, the basic charges are found as they are. Numerical values can be inputted from the input apparatus 14 as the coefficient K and the fixed charge R, and the inputted values are stored in the storage apparatus 19 as the coefficient K and the fixed amount R respectively by the CPU 11.

As described above, the input apparatus 14 functions as the inputting means, and the CPU 11 functions as the introduction plan information preparing means and the charge calculating means.

A CRT or a liquid crystal display 16 being an image display apparatus is connected to the CPU 11 via an image processing section 15. The image processing section 15 is composed of a processor for image processing. The CPU 11 or the image processing section 15 edits each charge of (1) through (4) and the total amount (5) calculated by the CPU 11 being the charge calculating means in the form of a document (an estimate, an invoice or the like), and prepares an image.

The image processing section 15 displays the estimate, the invoice or the like on the display 16 based on the prepared image in accordance with an instruction from the CPU 11. A speaker 18 is connected to the CPU 11 via an audio processing section 17. The audio processing section 17 is composed of a processor for audio processing, and outputs an alarm sound informing of data input failures from the speaker 18.

Further, a printer 22 is connected to the CPU 11. The CPU 11, as described above, edits each charge of (1) through (4) and the total amount (5) calculated by the CPU 11 being the charge calculating means in the form of a document (an estimate, an invoice or the like), and prepares a print image. The printer 22 prints the estimate, the invoice or the like based on the prepared print image.

In addition, the CPU 11 functions as a first repairing inventory managing section 2 that is the first repairing material inventory managing means, as an instructing material inventory managing section 23 that is the instructing material inventory managing means, and as a franchisee information managing section 24 that is the franchisee information managing means of the present invention by executing the various kinds of programs 21 stored in the storage apparatus 19.

In addition, the CPU 11 functions as a franchisee number managing section 25 that is the franchisee number managing means, as a branching plan information preparing section 26 that is the branching plan information preparing means, as a gross sales managing section 27 that is the gross sales managing means as a gross sales estimating section 28 that is the gross sales estimating means, and as a repairing material demand estimating section 29 that is the repairing material demand estimating means by executing the various kinds of programs 21 stored in the storage apparatus 19.

(Description of the First Repairing Material Inventory Managing Section 2)

The first repairing material inventory managing section 2 is the section for managing the inventory (number of stocks or quantity) of repairing materials to be supplied to franchisees. Repairing material inventory data 30 indicating an inventory of repairing materials kept by the franchise head office in its warehouse is stored in the storage apparatus 19.

Examples of the repairing material inventory data 30 include kinds of the repairing materials and the number (or the quantity) of stocks for each kind. A computer (not shown) is installed in the warehouse. The warehouse computer is connected to a network such as an LAN, and communicates data with the charge information processing apparatus 10 via the LAN.

When the charge information processing apparatus 10 receives information on the number (or the quantity) of shipments of a specific kind of repairing material from the warehouse computer, the CPU 11 calculates a number (or a quantity) by subtracting the received number (or quantity) of shipments from the number (or the quantity) of stocks of the specific kind of repairing material stored in the storage apparatus 19, and stores the calculated number (or the quantity) in the storage apparatus 19.

On the other hand, when the charge information processing apparatus 10 receives information on the number (or the quantity) of arrivals of a specific kind of repairing material from the warehouse computer, the CPU 11 calculates a number (or a quantity) by adding the received number (or quantity) of arrivals to the number (or the quantity) of stocks of the specific kind of repairing material stored in the storage apparatus 19, and stores the calculated number (or the quantity) in the storage apparatus 19.

The kinds of the repairing materials and the number of stocks for each kind stored in the storage apparatus 19 are displayed on the display 16 by the CPU 11 with the operator inputting a specific instruction from the input apparatus 14. It can be contemplated that, in displaying them on the display 16, the CPU 11 alarms the operator by displaying in different colors the kinds of the repairing materials having the number of stocks smaller than a threshold value set in advance and other kinds of the repairing materials. In this way, the CPU 11 functions as the second repairing material inventory managing means.

(Description of the Instructing Material Inventory Managing Section 23)

The instructing material inventory managing section 23 is the section for managing the inventory (the number of stocks) of instructing materials for instructing franchisees on the specific repairing method. Instructing material inventory data 31 indicating the inventory of the instructing materials kept by the franchise head office in its warehouse is stored in the storage apparatus 19. The instructing materials are the materials used for instructing the franchisees on the specific repairing method, and include instruction manuals, instructing teaching materials and the like.

Examples of the instructing material inventory data 31 include kinds of the instructing materials and the number of stocks for each kind. A computer is installed in the warehouse. The above-mentioned warehouse computer can be used as this computer. The warehouse computer is connected to a network such as an LAN and communicates data with the charge information processing apparatus 10 via the LAN.

When the charge information processing apparatus 10 receives information on the number shipments (or the number of arrivals) of the specific kind of instructing material from the warehouse computer, the CPU 11 calculates a number by subtracting the received number of shipments from the number of stocks of the instructing material stored in the storage apparatus 19 (or adding the received number of arrivals to the number of stocks), and stores the calculated number in the storage apparatus 19.

The kinds of the instructing materials and the number of stocks for each kind are displayed on the display 16 by the CPU 11 with the operator inputting a specific instruction from the input apparatus 14. It can be contemplated that, in displaying them on the display 16, the CPU 11 alarms the operator by displaying in different colors the kinds of the instructing materials having the number of stocks smaller than a threshold value set in advance and other kinds of the instructing materials. In this way, the CPU 11 functions as the instructing material inventory managing means.

(Description of the Franchisee Information Managing Section 24)

The franchisee information managing section 24 is the section for managing information of franchisees. Franchisee information 32 concerning the franchisees is stored in the storage apparatus 19. Examples of the franchisee information 32 include a name of a repairer (an automobile repairer) having concluded an agreement with the franchise head office, identification information of a location of the repairer, a contact of the repairer (a telephone number, an address, an e-mail address and the like), the date of the agreement, and the term of the agreement. The information is inputted from the input apparatus 14 by the operator, and is stored in the storage apparatus 19 as the pieces of the franchisee information 32 by the CPU 11.

When the operator inputs at least one of the pieces of the franchisee information 32 (for example, a specific repairer name), other pieces of franchisee information corresponding to the inputted specific repairer name (in this example, the identification information of the location of the repairer, the contact, the date of the agreement, and the term of the agreement) are extracted from the storage apparatus 19 and displayed on the display 16. In this way, the CPU 11 functions as the franchisee information managing means.

(Description of the Franchisee Number Managing Section 25)

The franchisee number managing section 25 is the section for managing the number of franchisees for each region. The CPU 11 extracts names and the like of the repairers existing in an identical region (for example, a unit of city, ward, town, village) from the franchisee information 32 stored in the storage apparatus 19 based on the identification information of the location of the repairer in the franchisee information 32 stored in the storage apparatus 19. The CPU 11 calculates the number of franchisees for each region by counting the extracted number. The calculated number of franchisees for each region is stored in the storage apparatus 19 (or the internal RAM 3).

The number of franchisees for each region stored in the storage apparatus 19 is displayed on the display 16 together with the name of the region by the CPU 11 with the operator inputting a specific instruction from the input apparatus 14. For example, if the number of franchisees in a region A of three and the number of franchisees in a region B of seventeen are stored in the internal RAM 3 as the number of franchisees for each region, it is contemplated that an indication such as "region A . . . three, region B . . . 17, total 20" is displayed on the display 16. In this way, the CPU 11 functions as the franchisee number managing means.

(Description of the Branching Plan Information Preparing Section 26)

The branching plan information preparing section 26 is the section for preparing information for preparing a branching plan based on the number of franchisees for each region managed by the franchisee number managing section 25, and outputting the information. Target number data that is the target number of franchisees to be arranged set for each region is stored in the storage apparatus 19. Examples of the target number data for each region include the target number in the region A of ten, the target number in the region B of seventeen, and the like. The target number data for each region is inputted from the input apparatus 14 by the operator, and stored in the storage apparatus 19 by the CPU 11.

The CPU 11 compares the number of franchisees in the specific region stored in the storage apparatus 19 and the target number of the region. If it is determined that the number of franchisees in the region is below the target number of the region as a result of the comparison, data indicating that the target is unattained for the region (target unattained data) is stored in the storage apparatus 19. On the other hand, if it is determined that the number of franchisees in the region exceeds the target number or is the same as the target number as a result of the comparison, data indicating that the target is attained for the region (target attained data) is stored in the storage apparatus 19.

The target unattained data and the target attained data stored in the storage apparatus 19 are displayed on the display 16 as information for preparing a branching plan by the CPU 11 with the operator inputting a specific instruction from the input apparatus 14. For example, it is contemplated that an indication such as "region A . . . three (target number is ten) target unattained, region B . . . seventeen (target number is seventeen) target attained, total twenty)" is displayed.

In displaying them on the display 16, the operator can grasp the degree of target attainment glancing at the display 16 by the CPU 11 displaying in different colors the name of the region where the target has been attained and the name of the region where the target has not been attained. In this way, the CPU 11 functions as the branching plan information preparing means.

(Description of the Gross Sales Managing Section 27)

The gross sales managing section 27 is the section for managing sales information of franchisees. The CPU 11 functions as sales information acquiring means by executing various kinds of programs. A communication control apparatus 34 as communication means connected to the CPU 11 is, for example, a modem, a TA (terminal adapter), a DSU (digital service unit), or a router, and is composed of an appropriate apparatus corresponding to the type of the network 70.

The charge information processing apparatus 10 communicates data with the estimation apparatus 40 via the communication control apparatus 34 and the network 70. When the charge information processing apparatus 10 receives sales information 33 of the franchisee from the estimation apparatus 40 via the communication control apparatus 34, the CPU 11 stores the received sales information 33 in the storage apparatus 19. Examples of the franchisee sales information include sales of a month, a week, or a day for each repairing service. Information for identifying a franchisee having sent sales information (a franchisee name, franchisee identification information or the like) is attached to the sales information of the franchisee.

The sales information 33 stored in the storage apparatus 19 is displayed on the display 16 together with the franchisee name by the operator inputting a specific instruction from the input apparatus 14. For example, it is contemplated that an indication such as "franchisee A . . . sales in March this year --- yen, franchisee B . . . sales in March this year --- yen, total sales --- yen" is displayed. In this way, the CPU 11 functions as the sales managing means.

(Description of the Gross Sales Estimating Section 28)

The gross sales estimating section 28 is the section for calculating a gross sales estimation in a predetermined period based on the sales information 33 managed by the gross sales managing section 27. The CPU 11 estimates and calculates gross sales in a predetermined period (a period in future) based on the sales information 33 (for example, sales information for each month in the past three years) stored in the storage apparatus 19.

For example, the CPU 11 calculates gross sales for each month for the past three years based on the sales information 33 in the past three years stored in the storage apparatus 19, and plots the gross sales on a coordinate system with sales for each month on the vertical axis and each month of the past three years on the horizontal axis. Gross sales in future can be preliminary estimated to be on an extended line of a straight line (or a curved line) represented by the plotted points. Therefore, gross sales in a fixed period in future can be estimated and calculated by the CPU 11. The calculated gross sales in the fixed period are stored in the storage apparatus 19 as the gross sales estimation information. In this way, the CPU 11 functions as the gross sales estimating means.

(Description of the Repairing Material Demand Estimating Section 29)

The repairing material demand estimating section 29 is the section for estimating demands for repairing materials based on the result of the gross sales estimation calculated by the gross sales estimating section 28. For example, it is assumed that gross sales C (an estimated value) in October 2000 is calculated by the above-mentioned gross sales estimating section 28 and stored in the storage apparatus 19 as gross sales estimation information as of August 2000. It is also assumed that a ratio W of sales of a specific kind of repairing material to the gross sales in the past three years and unit price data of the repairing material are stored in the storage apparatus 19.

An amount calculated by multiplying the gross sales C (an estimated value) in October 2000 by the ratio W stored in the storage apparatus 19 indicates gross sales (an estimated value) of the specific kind of repairing material in October 2000. When the gross sales (an estimated value) of the repairing material in October 2000 is divided by the unit price of the repairing material, a numerical value (an estimated value) representing a demand of the specific kind of repairing material in October 2000 can be calculated. The numerical value estimating the demand of the repairing material calculated as above is stored in the storage apparatus 19.

The numerical value estimating the demand of the repairing material stored in the storage apparatus 19 is displayed on the display 16 by the CPU 11 with the operator inputting a specific instruction from the input apparatus 14. For example, it is contemplated that an indication such as "demand for repairing material A in October 2000 is estimated to be --- " is displayed. In this way, the CPU 11 functions as the repairing material demand estimating means.

The CPU 11 also functions as notifying means by executing various kinds of programs stored in the storage apparatus 19. The CPU 11 being the notifying means notifies (transmits to) the charge collection handling agent side computer 90 of a request for collection handling of total amount (including a consumption tax and the like) via the communication control apparatus 34 in order to collect from the other party the total amount of (1) through (4) calculated by the charge calculating section 13 as described above. Further, the request for charge collection handling is transmitted by the operator inputting a specific instruction from the input apparatus 14.

Figure 3:
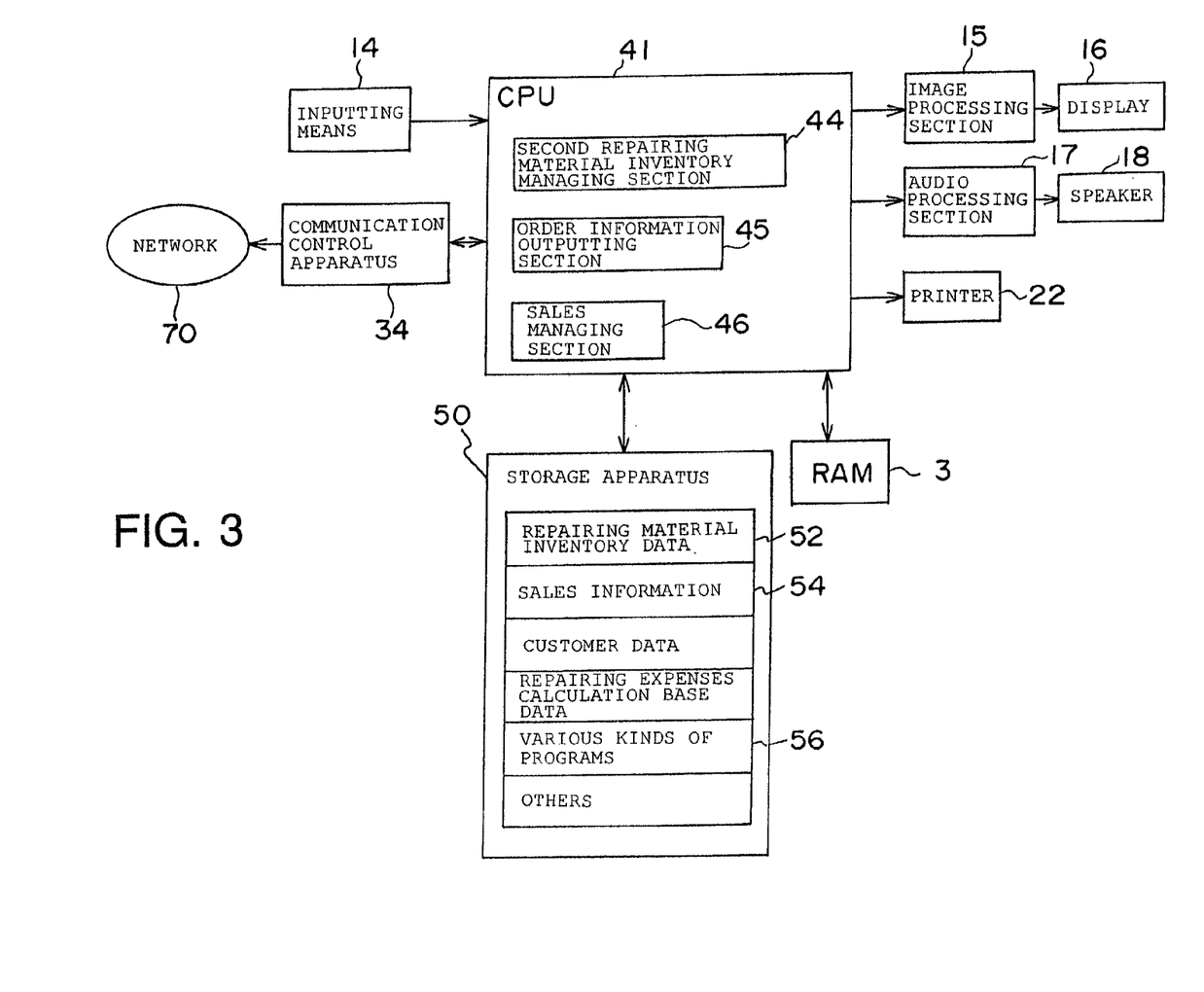
FIG. 3 is a block diagram illustrating a general configuration of an estimation apparatus of this embodiment.

FIG. 3 is a block diagram illustrating a configuration example of the estimation apparatus 40 of this embodiment. The estimation apparatus 40 is the apparatus for calculating an estimation of an automobile repairing service in the specific repairing method for a customer. The estimation apparatus 40 is provided with a CPU 41 that controls its operations. The CPU 41 functions as a second repairing material inventory managing section 44 that is the second repairing material inventory managing means, as an order information outputting section 45 that is the order information outputting means, and as a sales managing section 46 that is the sales managing means by executing various kinds of programs 56 (an operating system, an application and the like) stored in a storage apparatus 50.

The estimation apparatus 40 has the same configuration as the above-mentioned charge information processing apparatus 10 except in that various kinds of data and the various kinds of programs 56 stored in the storage apparatus 50 are different. Therefore, identical configurations are denoted by reference numerals identical with those of the charge information processing apparatus 10, and their description are omitted.

(Description of the Second Repairing Material Managing Section 44)

The second repairing material managing section 44 is the section for managing an inventory (a number of stocks or quantity) of repairing materials owned by a franchisee in which the estimation apparatus 40 is installed. Repairing material inventory data 52 indicating the inventory of the repairing materials kept by the franchisee in its warehouse is stored in the storage apparatus 50. Examples of the repairing material inventory data 52 include kinds of repairing materials, and a number of stocks or quantity for each kind. A computer (not shown) is installed in the warehouse. The warehouse computer is connected to a network such as an LAN, and communicates data with the estimation apparatus 40 via the LAN.

When the estimation apparatus 40 receives information on the number of shipments or the number of arrivals (the quantity of shipments or the quantity of arrivals) of a specific kind of repairing material from the warehouse computer, the CPU 41 calculates a number by subtracting the number of shipments (or subtracting the shipment quantity) from the number of stocks for the specific kind of repairing material stored in the storage apparatus 50, or adding the number of arrivals (or adding the quantity of arrivals) to the number of stocks, and stores the calculated number in the storage apparatus 50.

The kinds of repairing materials and the number of stocks for each kind stored in the storage apparatus 50 are displayed on the display 16 by the CPU 41 with the operator inputting a specific instruction from the input apparatus 14. It is contemplated that, in displaying them on the display 16, the CPU 11 alarms the operator by displaying in different colors the kinds of the repairing materials having the number of stocks smaller than a threshold value set in advance and other kinds of the repairing materials. In this way, the CPU 11 functions as the first repairing material inventory managing means.

(Description of the Order Information Outputting Section 45)

The order information outputting section 45 is the section for outputting information for ordering repairing materials. When the operator inputs a kind of repairing material and necessary number (or quantity) of the repairing material from the input apparatus 14, the inputted kind of repairing material and the necessary number, a franchise name stored in the storage apparatus 50 in advance, and franchise identification information are transmitted as order information to the repairing goods provider side computer 80 (or the charge information processing apparatus 10) by the CPU 41 via the communication control apparatus 34. In this way, the CPU 41 functions as the order information outputting means.

(Description of the Sales Managing Section 46)

The sales managing section 46 is the section for managing sales obtained through the provision of automobile repairing services based on the specific repairing method by franchisees. Sales information 54 is stored in the storage apparatus 50. Examples of the sales information include sales of a month, a week, or a day for each repairing service as described above. A computer (not shown) is installed in a shop of a franchisee.

The shop computer is connected to a network such as an LAN, and communicates data with the estimation apparatus 40 via the LAN. When the estimation apparatus 40 receives information on a specific kind of repairing service provided to a customer from the shop computer, an amount corresponding to the specific kind of repairing service is added to sales of the specific kind of repairing service of a day and gross sales of the day by the CPU 41 and stored in the storage apparatus 50. In this way, the CPU 41 functions as the sales managing means.

Figure 4:
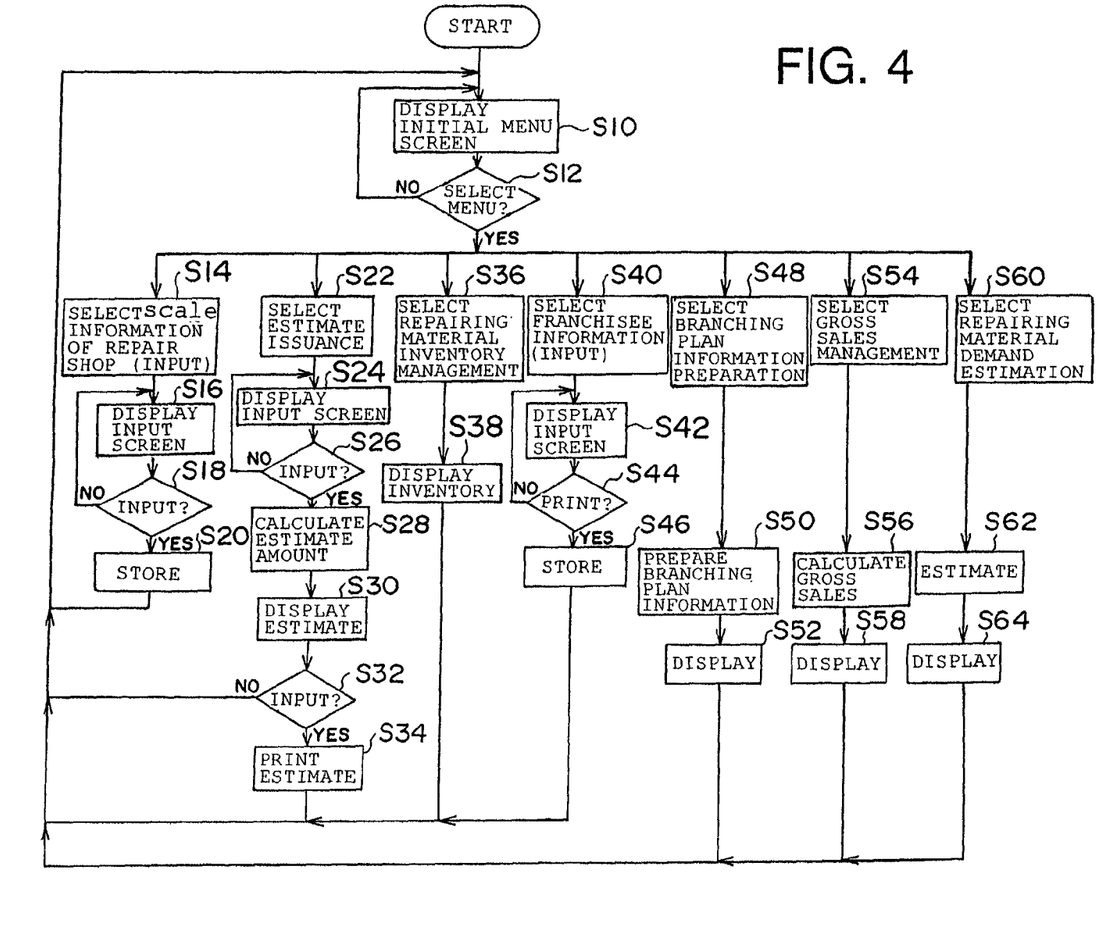
FIG. 4 is a flowchart describing operations of the charge information processing apparatus of this embodiment.

Operations of the charge information processing apparatus 10 having the above-mentioned configuration will now be described with reference to the flow chart shown in FIG. 4. When the charge information processing apparatus 10 is started up by turning on a power switch (not shown), the CPU 11 reads out the various kinds of programs 21 from the storage apparatus 19 to the internal RAM 3, and executes the same if necessary.

The CPU 11 displays an initial menu screen on the display 16 for selecting jobs performed by the operator (S10). Display examples of a menu include such items as "(A) scale information of a repair shop (input)", "(B) estimate issuance", "(C) invoice issuance", "(D) repairing material inventory management", "(E) instructing material inventory management", "(F) franchisee information (input)", "(G) branching plan information preparation", "(H) gross sales management", and "(I) repairing material demand estimation".

When a selected item is inputted from the input apparatus 14 by the operator, the CPU 11 determines which one of the above-mentioned (A) through (I) the selected item is (S12). If the inputted item is determined to be "(A) scale information of a repair shop" (S14), an input screen for a scale of a repair shop is displayed on the display 16 (S16). Configuration examples of the screen include each item of scale information of a repair shop to be inputted and input columns corresponding to the items. When data corresponding to each item of the scale information of the repair shop is inputted from the input apparatus 14, the inputted data is displayed on the input columns.

When the CPU 11 determines that input has been completed for all the items of the scale information (S18: Yes), the inputted scale information of the repair shop is stored in the internal RAN 3 (or the storage apparatus 19) (S20). Further, examples of each item of the scale information of the repair shop to be inputted include a repairer name, an area of its repair shop, its repair capability (such as the number of existing workers, repair machines and instruments held by the repairer), types of computers held by the repairer and the number of computers, and existence of an LAN and its scale as described above.

Figure 5:
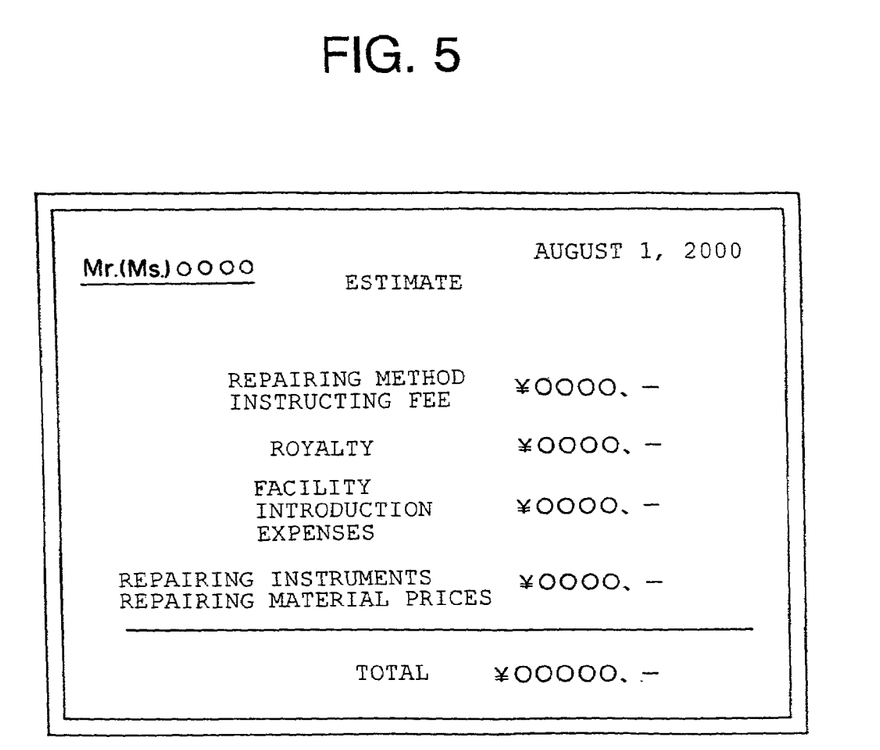
FIG. 5 is an example of an output of charges calculated by the charge information processing apparatus of this embodiment.

Then, if the inputted item is determined to be "(B) estimate issuance" (S22), an input screen for data required for issuing an estimate is displayed on the display 16 (S24). Data required for issuing an estimate includes a destination (a repairer name) of the estimate. When a specific destination is inputted by the operator from the input apparatus 14 (S26), introduction expenses of facilities required for as a franchisee (1) corresponding to the scale information inputted in step S20 are calculated, and an instruction fee for the specific repairing method (2), a royalty (3), prices of the repairing instruments and repairing materials required for implementing the specific repairing method, and their total amount (5) are calculated (S28) by the CPU 11 functioning as the charge calculating means as described above. When calculated, the amounts (1) through (5) are edited in the form of an estimate, and displayed on the display 16 by the CPU 11 as shown in FIG. 5 (S30).

Then, when a print instruction is inputted by the operator from the input apparatus 14 (S32: Yes), the CPU 11 prepares a print image of the estimate displayed on the display 16, and the printer 22 prints the estimate based on the print image (S34). Further, if the inputted item is determined to be "(C) invoice issuance" (S22), processing similar to the case of the above-mentioned estimate issuance is executed, an invoice is displayed on the display 16, and is printed by the printer 22 as well.

Then, if the inputted item is determined to be "(D) repairing material inventory management" (S36), the CPU 11 reads out the repairing material inventory data 30 from the storage apparatus 19 to the internal RAM 3, and displays inventory data on the display 16 based on the read out data (S38). It is contemplated that examples of inventory data displayed on the display 16 include indications of a name of a repairing material and its number or quantity of stocks such as "repairing material A . . . --- pieces, repairing material B . . . --- liter". Further, if the inputted item is determined to be "(E) instructing material inventory management" (S22), processing similar to the case of the above-mentioned repairing material inventory management is executed, and a name of a repairing material and its number of stocks are displayed on the display 16 such as "instructing material A . . . --- pieces, instructing material B . . . --- pieces" as well.

If the inputted item is determined to be "(F) franchisee information (input)" (S40), the CPU 11 displays an input screen of franchisee information on the display 16 (S42). Configuration examples of the screen include each item of franchisee information to be inputted and input columns corresponding to the items. When data corresponding to each item of the franchisee information is inputted from the input apparatus 14, the inputted data is displayed on the input columns.

When determining that input has been completed for all the items of the scale information (S44: Yes), the CPU 11 stores the inputted franchisee information in the storage apparatus 19 or the internal RAM 3 (S46). Further, examples of each item of the franchisee information to be inputted include a repairer name, identification information of the location of the repairer, the contact of the repairer (a telephone number, an address, an e-mail address, and the like), the date of the agreement, and the term of the agreement as described above.

If the inputted item is determined to be "(G) branching plan information preparation" (S48), information for branching plan preparation is generated (S50), and displayed on the display 16 (S52) by the CPU 11 functioning as the branching plan information preparing means as described above.

If the inputted item is determined to be "(H) gross sales management" (S54), sales information of each year or each month is classified for each franchise, and displayed on the display 16 by the CPU 11 functioning as the gross sales managing means as described above.

If the inputted item is determined to be "(I) repairing material demand estimation" (S58), the CPU 11 functioning as the repairing material demand estimating means estimates demands for repairing materials for a fixed period (S62), and displays the estimated results on the display 16 as described above.

As described above, according to the present invention, it is possible to provide a charge information processing apparatus for calculating introduction expenses of facilities required for working as a franchisee that provides automobile repairing services by a specific repairing method.

In addition, it is also possible to provide a charge information processing apparatus for calculating introduction expenses corresponding to a scale of a repair shop.

Further, according to the present invention, it is possible to provide a charge information processing apparatus for calculating all of introduction expenses for facilities required for working as a franchisee that provides automobile repairing services by a specific repairing method, an instruction fee for the specific repairing method, a royalty, and prices of repairing instruments and repairing materials required for implementing the specific repairing method.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A charge information processing apparatus for calculating charges required for working as a franchisee that provides automobile repairing services by a specific repairing method, comprising:
   means for inputting scale information of a repair shop into said charge information processing apparatus; and
   means for calculating introduction expenses required for facilities working as the franchisee providing the automobile repairing services by the specific repairing method, based on said scale information of a repair shop inputted into said charge information processing apparatus by said inputting means, and for calculating an instruction fee of said specific repairing method, a royalty, and prices of repairing instruments and repairing materials required for implementing said specific repairing method;
   means for managing information of franchisees;
   means for managing a number of franchisees for each region; and
   means for outputting information for preparing a branching plan based on the number of franchisees for each region that are managed by said means for managing a number of franchisees.

2. The charge information processing apparatus according to claim 1, wherein said specific repairing method comprises procedures associated with a repairing method, repairing instruments, and repairing materials that are devised to complete repairs within a predetermined amount of time.

3. The charge information processing apparatus according to claim 1, wherein said specific repairing method comprises procedures associated with a repairing method, repairing instruments, and repairing materials that are devised to perform repairs for predetermined charges.

4. The charge information processing apparatus according to claim 1, wherein said specific repairing method includes a repairing process in which usage amounts of repairing materials are defined.

5. The charge information processing apparatus according to claim 4, wherein said repairing instruments are provided with at least one measuring device for measuring repairing materials in amounts corresponding to said usage amounts.

6. The charge information processing apparatus according to claim 2, wherein said repairing method includes a repairing process in which usage duration of said repairing instruments is defined.

7. The charge information processing apparatus according to claim 6, wherein said repairing instruments are provided with at least one timing device for timing such that usage of said repairing instruments is finished within said usage duration.

8. The charge information processing apparatus according to claim 1 further comprising:
   a first means for managing inventories of repairing materials to be supplied to franchisees.

9. The charge information processing apparatus according to claim 1 further comprising:
   means for managing inventories of instructing materials for instructing franchisees on said specific repairing method.

10. The charge information processing apparatus according to claim 1 further comprising:
    means for acquiring sales information of franchisees;
    means for managing the gross sales information of franchisees acquired by said means for acquiring sales information of franchisees;
    means for estimating gross sales in a predetermined period based on the sales information that is managed by said means for managing the gross sales information of franchisees; and
    means for estimating demands of repairing materials based on results from said means for estimating gross sales in a predetermined period.

11. The charge information processing apparatus according to claim 10, wherein said means for acquiring sales information of franchisees acquires sales information from a means for calculating estimates for automobile repairing services by said specific repairing method via at least one communicating device.

12. The charge information processing apparatus according to claim 1, wherein said information inputted into said charge information processing apparatus comprises scale information of a repair shop, and said charge information processing apparatus further comprises:
    means for preparing introduction plan information required for facilities working as said franchisee based on the scale information of the repair shop inputted by said means for inputting scale information of said repair shop.

13. The charge information processing apparatus according to claim 12, wherein said means for calculating introduction expenses calculates the introduction expenses based on the introduction plan information prepared by said means for preparing introduction plan information.

14. The charge information processing apparatus according to claim 1, wherein said means for calculating estimates for automobile repairing services calculates an amount totaling the introduction expenses, the instructing fee, the royalty, and the prices of repairing instruments and repairing materials.

15. The charge information processing apparatus according to claim 1 further comprising:
    means for notifying a charge collection handling agent of a request for collection handling of a total amount.

16. The charge information processing apparatus according to claim 14 further comprising:
    means for outputting the introduction expenses, the instructing fee, the royalty, the prices of repairing instruments and repairing materials, and the total amount thereof calculated by said means for calculating estimates for automobile repairing services after editing them in a predetermined document format.

17. The charge information processing apparatus according to claim 16, wherein said means for outputting estimates for automobile repairing services is an image display apparatus.

18. The charge information processing apparatus according to claim 16, wherein said means for outputting estimates for automobile repairing services is a printer.

19. The charge information processing apparatus according to claim 17, wherein said predetermined document format is one of an estimate format and an invoice format.

20. A franchise system apparatus comprising:
    a charge information processing apparatus included in the franchise system apparatus for calculating charges required for working as a franchisee that provides automobile repairing services by a specific repairing method;

an estimation apparatus included in the franchise system apparatus for calculating estimates of automobile repairing services by said specific repairing method; and a communication apparatus included in the franchise system apparatus for communicating data between said charge information processing apparatus and said estimation apparatus, wherein said charge information processing apparatus comprises an input apparatus for inputting scale information of a repair shop into said charge information processing apparatus;

means for managing information of franchisees;

means for managing the number of franchisees for each region;

means for outputting information for preparing a branching plan based on the number of franchisees for each region that are managed by said means for managing information of franchisees; and means for calculating introduction expenses required for facilities providing said automobile repairing services, based on scale information of a repair shop, an instructing fee for instructing said specific repairing method, a royalty, and prices of repairing instruments and repairing materials required for implementing said specific repairing method.

21. The franchise system apparatus according to claim 20, wherein said estimating apparatus is further provided with a second means for managing inventories of repairing materials owned by franchisees.

22. The franchise system apparatus according to claim 21, wherein said estimation apparatus is further provided with means for outputting information for ordering repairing materials.

23. The franchise system apparatus according to claim 22, wherein said estimation apparatus is further provided with means for managing information on sales by providing the automobile repairing services based on said specific repairing method.

24. A charge information processing apparatus for calculating introduction expenses required for facilities working as a franchisee that provides automobile repairing services by a specific repairing method, comprising:

means for storing charge calculation base data for calculating introduction expenses corresponding to scale information of an automobile repair shop;

means for inputting the scale information of the automobile repair shop into said charge information processing apparatus;

means for managing information of franchisees;

means for managing the number of franchisees for each region;

means for outputting information for preparing a branching plan based on the number of franchisees for each region that are managed by said means for managing the number of franchisees; and means for calculating the introduction expenses based on the inputted scale information of a repair shop and said charge calculation base data stored in said means for storing charge calculation base data;

wherein said charge calculation base data comprises:

calculating an instruction fee for said specific repairing method;

calculating a royalty, and calculating prices of repairing instruments and repairing materials required for implementing said specific repairing method.

25. The charge information processing apparatus according to claim 24, wherein said charge calculation base data is an introduction plan table associating the scale information of the repair shop with introduction plan information, and a charge list, and said means for calculating the introduction expenses reads out introduction plan information corresponding to the inputted scale information with reference to said introduction plan table, and calculates the introduction expenses based on the read out introduction plan information and the charge list.

* * * * *